Patented Aug. 7, 1928.

1,680,234

UNITED STATES PATENT OFFICE.

WILLIAM BURTON WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS.

PLASTIC MATERIAL.

No Drawing.   Application filed January 13, 1927.   Serial No. 161,026.

This invention relates to plastic materials; and it comprises a composition of asbestos and rubber derived from latex, said rubber being ordinarily curved or vulcanized and existing as an integral body permeating the interstices of fiber bundles, as well as spacing and uniting them, and the proportion of rubber to fiber varying from that required for a cemented fiber article to that required for a fiber reinforced rubber article; and it also comprises a method of making asbestos plastics, wherein asbestos is treated to free it of impurities coagulating latex, this usually being done by an acid extraction, is then mixed with commercial latex in the desired proportion, and rubber produced from the latex either by coagulation or gelling; all as more fully hereinafter set forth and as claimed.

Commercial latex is the milky sap of Hevea stabilized by the addition of a little ammonia. It is a thin, mobile liquid, capable of entering capillaries and of passing through filter paper. If dried, it yields gelled rubber; a form of rubber in its properties much like milled plantation rubber. Or if acidified or otherwise treated, latex yields, coagulation rubber; a particular form of rubber characterized by a certain reticulate structure. Latex can be, and is, used for cementing fibers of various kinds and in certain copending applications I have described another utilization wherein it is used in the production of reinforced rubber.

A fiber which is desirable for use with latex is ordinary asbestos. Asbestos as it comes on the market is not a single mineral. Two fibrous minerals are sold as "asbestos", these being chrysotile and a fibrous form of amphibole. The present invention contemplates the use of either form of asbestos with latex.

I have found that neither form of asbestos as it comes on the market can be directly used with commercial latex where intimate and uniform impregnation with rubber is wanted, for the reason that on admixture with latex, coagulation begins at once. Unlike most other fibers, commercial asbestos does not permit the latex to enter interstices of the fibers or fiber bundles and permeate them prior to coagulation. As to the reason for this specific coagulative property of asbestos, I am not aware and content myself with noting the fact.

I have, however, found that asbestos extracted with an acid and washed, no longer possesses this coagulating property. After extraction, the asbestos can be used in connection with latex with as much facility as can ordinary vegetable fibers and in much the same way. Any proportions may be used. The result is in a measure unexpected, since the treatment of most minerals with acid removes bases and renders them capable of absorbing ammonia and ammonia is the stabilizing agent in latex. Nevertheless, the fact is as stated and its existence renders possible the production, with the aid of latex, of a number of new materials of great economic value.

One utilization is the manufacture of insulated wire. It is desirable to use asbestos in the insulation of magnet wire for some purposes; but long fiber asbestos is not only expensive but is difficult to work and particularly to convert into a smooth and unbroken coating of uniform thickness on a wire. I find however that acid treated and washed short-fiber asbestos, which is relatively cheap, can be admixed with latex to form a sort of pulp which can then be conveniently applied to wire; being thereafter dried in place in the event that a coating having the properties of gelled rubber is required. Or the coating after application can be coagulated in place by treatment with a little acid, as by running the coated wire through a bath of 30 per cent acetic acid. The present invention can be used in forming coatings either of vulcanized or unvulcanized rubber as may be desired. When a vulcanized coating is wanted, finely divided sulfur is added to the latex prior to incorporating the asbestos. Or the latex may be in a partially prevulcanized condition. Sometimes it is desirable to add a little soap to the latex to enable easier admixture with sulfur. With sulfur-containing latex or partially prevulcanized latex, on incorporation of the asbestos and application to the wire, after coagulation or gelling, the wire may be heated to the proper degree to produce vulcanization. Where the fiber mass impregnated with latex is a fabric, such as woven goods, knitted wire covering, etc., flowers of sulfur cannot be directly used as it is filtered out of the latex by the fiber. Sulfur can however, be formed in place from a suitable polysulfid; or the latex can be prevulcanized.

The manufacture of insulated wire is merely one species of the present invention, as it is useful in many other and widely different fields, such as making brake linings. Such linings may be made by impregnating a carrieer body, such as an open weave wire fabric with a pulp or paste of asbestos, latex, vulcanizing agents and if desired, suitable accelerators.

The fact that acid treated asbestos is miscible with latex enables convenient preparation of pulps from which asbestos paper or board may be made. As before, vulcanized rubber may be produced if wanted. If asbestos cemented with latex is wanted, not more than 15 or 20 per cent of latex rubber is used in the final product. Commercial latex usually carries around 30 per cent rubber. Where asbestos-reinforced rubber, as contradistinguished from cemented asbestos, is wanted the proportion of latex should be considerably increased. Since the amount of latex asbestos will hold without dripping or draining is limited, in securing high rubber ratios special expedients are useful. One way of making reinforced rubber is to use a shallow pan-shaped mold containing a certain amount of latex. Into a bath or body of latex in this mold is stirred the desired amount of acid-washed asbestos and a little acid is added; the whole being then allowed to stand for coagulation. The rubber will form a sheet of coagulum including the asbestos in distributed form and having the desired rubber-asbestos ratio. Working in this way, any desired proportion may exist between rubber and asbestos. In making asbestos-reinforced rubber I do not ordinarily desire more than about 25 per cent of distributed asbestos by volume, although up to 35 per cent may be used and still produce rubbery materials with the fiber acting as a reinforcement only. In producing bonded abrasive articles where the rubber is present only in small proportions very little asbestos is used with the rubber. Good abrasive wheels can be made with as little as 10–15 per cent asbestos in the asbestos-rubber composition. Asbestos present in this ratio tremendously increases the hardness of the bond without appreciably decreasing its tensile strength.

Rubber can be produced from latex in two forms which are quite different: as gel rubber and as coagulation rubber. In general, in making the present articles drying to produce a gel is preferable to coagulation; partly because of the continuous nature of the gel film and partly because of its vulcanizing characteristics. Where a relatively thick mass is to be gelled, vacuum drying is best and drying should be effected slowly at first since a sudden lowering of the pressure causes boiling and disturbance. Drying to a gel involves a certain shrinkage which aids in producing a hard firm product. Coagulation involves more shrinkage but the reticulate structure disturbs the sulfur distribution and the tensile strengths obtained are of the order of 20 per cent lower than with identical gel mixes at the same cure. When the rubber bond is obtained in the form of a gel I prefer to make a dough or paste of the treated asbestos, latex, vulcanizing agents and fillers and dry the same under regulated drying conditions as stated. After drying a spongy or open textured article is produced. When this is compressed the warm dry cellular rubber surfaces weld into an integral body of rubber. Molded articles of all sorts in such diversified classes as abrasive wheels and vulcanized high pressure gaskets may be made without waste by shaping a doughy composition in a mold so sized and shaped as to permit drying and subsequent mold vulcanizing.

One great advantage of the present process is that it completely eliminates the necessity for the use of inflammable solvents, most of which are dangerous and detrimental to health.

I find hydrochloric acid convenient for extracting the asbestos. Surfuric acid may, however, be used. In using hydrochloric acid, the asbestos is immersed in boiling 5 to 10 per cent commercial acid and maintained therein for 8 or 10 minutes. The asbestos is then washed. This length of treatment substantially removes coagulating properties from asbestos. A shorter treatment leaves some coagulating power. Sometimes this is desirable. Boiling asbestos with an acid causes its fibers to so open up that non-fibrous particles settle out readily and enables easy removal of bits of rock and non-fibrous mineral matter; a matter usually of some difficulty. This removal is important in the preparation of magnet wire covering and of thin asbestos tissue. Asbestos fibers may be acid treated, washed and so treated as to yield uniformly textured masses suitable for carding.

Where flexible materials are wanted, the proportion of asbestos should not be high; say, not over 35 per cent by volume. Perhaps 25 per cent is a better upper maximum. With not more than 25—35 per cent fiber, the article produced has the general properties of rubber. It has extension to a certain degree; extension beyond this point being arrested by the presence of the fiber. In nearly all compositions under the present invention, I employ distributed fiber in random arrangement. This not only gives me better strength for many purposes, but avoids the development of fissile or laminar structure during pressing operations. Where articles in the nature of cemented fiber are wanted, I quite frequently employ oriented fibers, as in using asbestos fabrics. In making cemented articles with random fiber, where rigidity is required in greater or less degree, I commonly reduce the proportion of rubber to a rather low amount. I have made excellent caster wheels with as little as 17.5 per cent rubber; the residue being short fiber asbestos.

Rubber cemented asbestos articles having a major proportion of asbestos and a minor proportion of rubber or rubber composition, with the fiber uniformly distributed in random arrangement, are novel in the art. By milling methods, it is impracticable to work more than about 35 per cent of asbestos fiber into 100 parts of rubber or rubber composition and in milling the fiber is badly comminuted, while the coagulating properties of natural asbestos preclude making uniform mixtures with the aid of commercial latex and commercial asbestos. Rubber "solutions" made with benzol and the like have physical properties which preclude practically their use for making asbestos-rubber articles of the class here desired; articles without grain or lamination and with uniformly distributed random fiber.

Articles of cemented asbestos of this kind I do not, however, herein claim specifically, and particularly wheels for use in casters, pulleys, roller skates, etc., this forming the matter of a copending application, Serial No. 160,533 filed January 11, 1927.

The present invention lends itself well to the manufacture of the described articles of rubber reinforced with asbestos; that is, articles ranging from those of flexible and resilient nature, such as those used for magnet wire to those which are hard and of the general nature of hard rubber or ebonite. For ebonite, the present invention is particularly applicable, since the asbestos is a good reinforcing fiber and at the same time well withstands the heat and chemical actions involved in vulcanization. In making hard rubber articles, much of the rubber used may be from other sources than latex. For example, hard rubber buffings and the like may be included in the composition. Large proportions of the ordinary fillers, such as carbon black, zinc white, etc., and of rubber substitutes and of rubber surrogates may be used; in fact, in making such hard rubber compositions, the office of the latex may be mainly to permeate and impregnate the asbestos fiber, and unify the rubber from other sources, so that in the final article the fiber will be in cohering relation to an integral body of rubber. In such a composition, as ebonite articles, rubber may come from various sources; but all the rubber is converted into an integral mass; this mass containing the asbestos as the reinforcement.

What I claim is:—

1. As a new plastic material, acid washed asbestos and uncoagulated latex.

2. As a new plastic material, acid washed asbestos and gelled latex.

3. As a new material, a plastic composed of acid washed asbestos bonded by an integral body of rubber derived from latex, said rubber permeating the fiber bundles.

4. A rubber article containing distributed acid washed asbestos fiber as a reinforcement, the rubber permeating the asbestos fibers and the asbestos constituting not more than 35 per cent of the total volume of the composition.

5. A hard rubber article containing distributed acid washed asbestos fiber in random arrangement as reinforcement, said asbestos fiber constituting not more than 35 per cent of the total volume and being permeated by rubber.

6. The process of making asbestos containing plastics which comprises extracting asbestos with acid washing and admixing the extracted asbestos with latex.

In testimony whereof, I have hereunto affixed my signature.

WILLIAM BURTON WESCOTT.